Patented May 4, 1954

2,677,703

UNITED STATES PATENT OFFICE 2,677,703

PRODUCTION OF BIBENZYL DICARBOXYLIC ACIDS

William G. Toland, Jr., Richmond, Calif., assignor to California Research Corporation, San Francisco, Calif., a corporation of Delaware No Drawing. Application September 26, 1950, Serial No. 186,927

9 Claims. (Cl. 260—515)

The present invention relates to a new and improved polymerization process and, more particularly, to a process wherein toluic acids are dimerized to produce bibenzyl dicarboxylic acids, stilbene dicarboxylic acids and mixtures thereof.

Various methods for preparing bibenzyl dicarboxylic acids and stilbene dicarboxylic acids have been heretofore disclosed in the art. The previous methods, however, are generally characterized either by the use of expensive reagents in the preparation or by poor yields of bibenzyl dicarboxylic acid and stilbene dicarboxylic acid. Furthermore, numerous by-products are usually formed in preparing bibenzyl dicarboxylic acids and stilbene dicarboxylic acids according to the previously known methods and these by-products in turn serve to render the product more difficultly separable and necessitate additional purification steps in the process.

One of the processes proposed for previous preparations of bibenzyl dicarboxylic acid that may be considered illustrative of the prior state of the art is that disclosed in an article by Liebermann and Mitter in Berichte der Deutschen Chemische Gesellschaft, vol. 45, on page 1209, published in 1912. In this preparation bibenzyl, oxalyl chloride, aluminum chloride and carbon disulfide were cooled in ice and reacted for about 5 hours with stirring. The reaction product was then treated with aqueous hydrochloric acid and the carbon disulfide taken off. The resultant mixture, consisting of bibenzyl para-monocarboxylic acid and 4,4'bibenzyl dicarboxylic acid, was treated with acetic acid to extract the bibenzyl monocarboxylic acid. Although a fair yield of bibenzyl dicarboxylic acid was obtained by this method, great quantities of oxalyl chloride and aluminum chloride were used which could not be recovered, thus rendering the process expensive and economically impossible.

Another prior art process for preparing bibenzyl dicarboxylic acid is that disclosed by Fischer and Wolffenstein in vol. 37 of Berichte der Deutschen Chemische Gesellschaft on page 3215, published in 1904. In this process para-toluic acid was stirred with an aqueous solution of potassium persulfate and sodium hydroxide at 60 to 70° C. for 3 days. After this time the reaction was complete and most of the acid precipitated following cooling for 12 hours. The reaction product was extracted with methanol and the residue consisted of a very small amount of bibenzyl dicarboxylic acid contaminated with some terephthalic acid. The bibenzyl dicarboxylic acid was finally separated by treating the product to form the acid chloride of the bibenzyl dicarboxylic acid, a reaction which the terephthalic acid does not readily undergo.

A previous preparation of stilbene dicarboxylic acid illustrative of the prior state of the art is that disclosed in an article by Hager, Van Arendonk, and Shonle, appearing in the Journal of the American Chemical Society, vol. 66, page 1982, in 1944. In this article the authors disclosed a process wherein dibenzyl was brominated in the 4,4' and $\alpha\alpha'$ positions to produce 4,4',$\alpha\alpha'$ tetrabromodiphenyl ethane and then converted to 4,4'dicyano stilbene by treatment with cuprous cyanide. Alcoholysis of the nitrile radicals was used to produce the diethyl ester, which was then saponified to produce p,p'stilbene dicarboxylic acid. The stilbene dicarboxylic acid product was obtained only in very low yields and no constants were given other than its neutral equivalent of 131, which was comparable to the theoretical neutral equivalent of 134. The carbon-hydrogen analysis was also relied on in identifying the product.

Another and more recent disclosure of a process for preparing stilbene dicarboxylic acids is an article by Bell and Waring which appeared in the Journal of the Chemical Society for July 1948, on pages 1024–6, inclusive. In this article para-cyanobenzaldehyde and para-cyanobenzyl cyanide were heated and treated with piperidine to give $\alpha4,4'$tricyano stilbene which, upon hydrolysis with $H_2SO_4$ and acetic acid, produced $\alpha$-cyano 4,4'stilbene dicarboxylic acid. The $\alpha$-cyano 4,4'stilbene dicarboxylic acid was in turn heated with potassium hydroxide to give $\alpha4,4'$stilbene tricarboxylic acid, which, on decarboxylation of the ethylene linkage, resulted in 4,4'stilbene dicarboxylic acid.

It will be noted that in the above preparations, the reactions were characterized by poor yields, long reaction times or the use of large amounts of expensive reagents. All of these drawbacks, as well as others inherent in the prior art methods, serve to emphasize their lack of commercial feasibility in the production of bibenzyl dicarboxylic acids or stilbene dicarboxylic acids.

In the prior art, so far as known, no processes of preparing bibenzyl dicarboxylic acids and stilbene dicarboxylic acids simultaneously as mixtures of the acids themselves have been described.

I have found that bibenzyl dicarboxylic acids can be conveniently prepared by heating toluic acids in the presence of sulfur under a hydrogen sulfide pressure to dehydrogenate and concurrently dimerize said toluic acids at their methyl groups and thereafter separating the bibenzyl dicarboxylic acids from the reaction product. Mixtures including both bibenzyl dicarboxylic acids and stilbene dicarboxylic acids, hereinafter referred to generally as "dimer acids," as well as the stilbene dicarboxylic acids themselves, can also be readily prepared according to this process. I have further found that stilbene dicarboxylic acids can be readily reacted with hydrogen sulfide to produce bibenzyl dicarboxylic acids.

The following equations are illustrative of the reactions which appear to be involved in the preparation:

I.
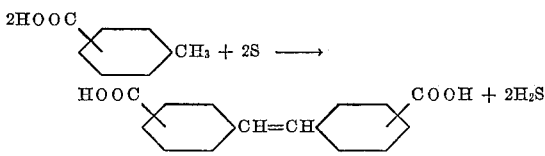

II.
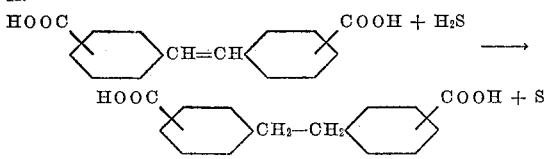

III.
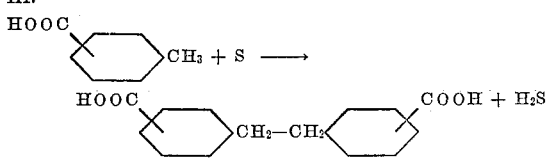

In the above illustrations it should be borne in mind that the equations are not to be construed as setting forth the exact mechanism of the reaction whereby the bibenzyl dicarboxylic acids, stilbene dicarboxylic acids and mixtures thereof are obtained by the process of this invention. It is probable, however, that stilbene dicarboxylic acids are first produced in the reaction as shown in Equation I. The stilbene dicarboxylic acids are then probably reduced by hydrogen sulfide to form the bibenzyl dicarboxylic acids in accordance with Equation II. The overall reaction proceeding directly from toluic acids to bibenzyl dicarboxylic acids is conveniently expressed in Equation III. In the above equations, however, it must be understood that a pressure of $H_2S$ on the system is necessary to favor formation of dimer acids.

The toluic acids from which the bibenzyl dicarboxylic acids, stilbene dicarboxylic acids and mixtures thereof are prepared, according to my invention, may be either the ortho-, meta- or para-isomers of toluic acids, or their mixtures. The para-isomer of toluic acid is preferred for present purposes since it produces a higher yield of dimer acids than either the ortho- or meta-isomers of toluic acids. The para-isomer of toluic acid is also preferred for the reason that its bibenzyl dicarboxylic acid products are characterized by a relatively high degree of insolubility in the reaction mixture which renders them easily separable.

Mixtures of ortho-, meta- and para-isomers of toluic acid which are suitable for use in the present invention may vary widely in regard to the proportions of the different isomers. A mixture of approximately 30% meta-toluic acid and approximately 70% para-toluic acid is quite economical to use and very suitable for the reaction. However, mixtures containing a higher percentage of the preferred para-toluic acid are considered more desirable as, for example, a mixture of 1 to 10% meta-toluic acid and 90 to 99% para-toluic acid. These mixtures of the isomers of toluic acid may be utilized with little or no change in the reaction conditions employed with the pure isomers.

The various isomers of toluic acid used in this invention as well as the mixtures thereof may be obtained from any practical source. One source, for example, that has been found quite suitable for the preparations of the present invention is the production of toluic acid and isomeric mixtures thereof by the partial oxidation of xylenes and their isomeric mixtures.

The sulfur employed in the reaction may be present in any of its elemental forms. Active sulfur from other sources such as hydrogen polysulfides, organic polysulfides, hydrogen sulfide and sulfur dioxide, hydrogen sulfide and stilbene dicarboxylic acids, etc., may also be used in the process. All of the foregoing materials either contain elemental sulfur or are converted to elemental sulfur under the conditions of the reaction and as such are included within the scope of the term "sulfur" set out in the appended claims. However, for the purposes of the experiments whereby the improved process, according to the present invention, was derived, it was found that elemental sulfur was particularly suitable.

The reaction temperatures utilized in preparing bibenzyl dicarboxylic acids, stilbene dicarboxylic acids and their mixtures, according to the process of my invention, may vary over a range of from about 400° F. to about 700° F. A particularly suitable range of temperatures is from about 500° F. to about 600° F. while reaction temperatures of about 550° F. are preferred.

Various proportions of the toluic acids and the sulfur of the reaction may be used as will be apparent to those skilled in the art from reading this disclosure. So long as some sulfur is present the reaction will proceed. As much as 4 mols or more of sulfur to 1 mol of the toluic acid may be used in the reaction although smaller proportions ranging from about 5 to about 75 mol per cent of sulfur are ordinarily satisfactory.

The reaction may be carried out at atmospheric or superatmospheric pressures of hydrogen sulfide. These hydrogen sulfide pressures can be suitably obtained by pressurizing the reaction system with hydrogen sulfide gas, but for present purposes autogenous pressures of hydrogen sulfide developed by the reaction of the toluic acids with the sulfur, etc. are more convenient to use. The autogenous pressures may be controlled and held to any desired point by bleeding off excess gas, etc. The superatmospheric pressures of hydrogen sulfide, for example, may range as high as the equipment used will permit, usually around 4,000 pounds per square inch where the pressure is derived autogenously without the aid of compressors. The more suitable pressures of hydrogen sulfide, however, range from about 0 to 1,000 pounds per square inch gauge and preferably from about 125 to 600 pounds per square inch. However, it has been found that the higher the pressure of hydrogen sulfide the lower is the rate of reaction and it is therefore preferred to operate within the lower presure of the above range.

The reactants are maintained in contact under the above disclosed conditions for any period of time sufficient to obtain conversion, usually ranging from about 30 minutes to 30 hours, depending on the particular reactants used and their proportions. Ordinarily, from about 2 to 6 hours reaction time is sufficient for completion of the reaction.

If desired, an inert diluent, such as diphenyl ether, etc., may be used in carrying out the reaction. Although such diluents may tend to facilitate the various steps in the reaction, there is ordinarily an accompanying decrease in the rate of reaction; so, for present purposes it is preferred to perform the reaction without diluents.

The bibenzyl dicarboxylic acids, stilbene dicarboxylic acids and dimer acid mixtures, prepared according to the process of my invention, may be separated from the reaction mixture by any means known to the art. The use of selective solvents may be adapted to the separation stage. In one particular method of separation satisfactory for the purposes of the invention, the 4,4'-bibenzyl dicarboxylic acid, 4,4'stilbene dicarboxylic acid and their mixtures are recovered by extracting the crude reaction mixture with boiling xylene to remove para-toluic acid, sulfur and other by-products. The remaining by-products in the crude reaction mixture are then removed by further extraction with hot dioxane. The residue from these extractions with boiling xylene and dioxane contains the two dimer acids constituting the main products of this reaction, namely, 4,4'stilbene dicarboxylic acid and 4,4'-bibenzyl dicarboxylic acid.

To separate the dimer acid mixture into its components the bibenzyl dicarboxylic acid and stilbene dicarboxylic acid may be first dissolved and neutralized with potassium hydroxide solution to form the corresponding potassium salts of the dimer acids. Since the potassium salt of 4,4'bibenzyl dicarboxylic acid is more soluble in water than the corresponding salt of 4,4'-stilbene dicarboxylic acid, it is then possible to crystallize the 4,4'stilbene dicarboxylic potassium salt, leaving the potassium salt of 4,4'-bibenzyl dicarboxylic acid in solution. The bibenzyl dicarboxylic acid may then be recovered from the solution by precipitation with an excess of hydrochloric acid.

Other methods of separation may also be used to recover the bibenzyl dicarboxylic acids from the dimer acid mixture such as, for example, the use of solvents which readily dissolve bibenzyl dicarboxylic acid but do not dissolve stilbene dicarboxylic acids. Examples of these solvents capable of preferentially dissolving 4,4'bibenzyl dicarboxylic acid over 4,4'stilbene dicarboxylic acid, for instance, are para-toluic acid, cyclohexanone, nitrobenzene, acetophenone, diphenyl ether, dimethyl phthalate, benzaldehyde, methyltoluate, ethylene glycol, diethylene glycol, monomethyl ether, etc. As already briefly mentioned, the various salts of the stilbene dicarboxylic acids and bibenzyl dicarboxylic acids are characterized by different solubilities at different temperatures and, in view of this fact, conversion to the salts of ammonium, potassium, sodium, etc., followed by precipitation of the less soluble salts may be utilized in one form or another as a desirable means of purification.

The following examples and the data obtained thereby are submitted in illustration of the process according to this invention.

*Example 1*

85 g. of para-toluic acid were mixed thoroughly with 5 g. of sulfur and the mixture placed in an open-ended glass liner, which was sealed in a stainless steel pressure bomb. The bomb and contents were placed in an oil bath maintained at 550° F., and allowed to remain for 3 hours during which there was an autogenous pressure increase of from 0 to 250 pounds per square inch gauge. The bomb was removed from the bath and allowed to cool. The products were then removed from the bomb and liner and extracted with 500 cc. of hot xylene, filtered hot, and then washed with more hot xylene. The undissolved cake was extracted with about 200 cc. of hot dioxane, filtered, and washed. The cake was dried, and the xylene and dioxane evaporated from the respective solutions. There were thus obtained 70.0 g. of xylene-soluble material, 3.4 g. of dioxane-soluble material, and 14.2 g. of insoluble product. The insoluble product consisted primarily of a mixture of 4,4'stilbene dicarboxylic acid and 4,4'bibenzyl dicarboxylic acid.

The above 14.2 g. of mixed dimer acids were next dissolved in 400 cc. of hot water containing 7 g. of potassium hydroxide. To the hot filtrate was added 25 g. of potassium chloride to reduce the solubility of the 4,4'stilbene dicarboxylic acid salt. The mixture was then cooled to room temperature and the potassium salt of the stilbene dicarboxylic acid was filtered off. The filtrate was treated with a little activated charcoal, filtered, and the 4,4'bibenzyl dicarboxylic acid precipitated from the hot solution with aqueous hydrochloric acid. The 4,4'bibenzyl dicarboxylic acid was filtered and dried, giving 5.4 g. of acid.

The potassium salt of the 4,4'stilbene dicarboxylic acid obtained as precipitate in the preceding operation was dissolved in hot water, and the free acid precipitated by HCl, filtered, washed and dried, giving 8.5 g. of dimer acids analyzing about 85% 4,4'stilbene dicarboxylic acid and 15% 4,4'bibenzyl dicarboxylic acid.

The para-toluic acid was sublimed from a sample of the xylene-soluble material noted in the first paragraph of this example, and it was found that 66.0 g. of para-toluic acid had not reacted and could be recycled for further reaction. 19.0 g. of para-toluic acid had apparently reacted to give the aforementioned 14.2 g. of dimer acids, a yield of about 75%.

*Example 2*

85 g. of para-toluic acid and 8 g. of sulfur were placed in an open-ended glass liner. The toluic acid was melted, the tube stoppered, and shaken until the sulfur dissolved. The liner and contents were sealed in a stainless steel pressure bomb. Hydrogen sulfide was added to the bomb until a pressure of 200 pounds per square inch gauge was reached at room temperature. The bomb was then immersed in an oil bath maintained at 595° F. The pressure in the bomb increased to 400 pounds per square inch at reaction temperature. The bomb was intermittently removed from the bath, and the excess hydrogen sulfide bled off so as to maintain the pressure between 200 and 475 pounds per square inch. After 3½ hours, the bomb was removed from the bath and cooled. The products were extracted with hot xylene and hot dioxane as in the preceding example. There were thus obtained 37.4 g. of unreacted para-toluic acid, 15.6 g. of by-products, and 32.0 g. of dimer acids. Hence, 56% of the para-toluic acid charged had reacted, while 67.3% of the toluic acid that reacted was found in the form of mixed dimer acids.

The mixed dimer acids were dissolved in 900 cc. of a hot aqueous solution containing 15 g.

of potassium hydroxide. The hot solution was filtered, and 40 g. of potassium chloride were added to the hot filtrate. After cooling to room temperature, the precipitate of potassium salts which had formed was filtered from the solution. The cake was washed with a saturated solution of potassium chloride. The acids were freed from the filtrate and the cake by acidifying the hot solutions with hydrochloric acid. There were obtained 19.0 g. of 4,4'stilbene dicarboxylic acid, and 13.0 g. of 4,4'bibenzyl dicarboxylic acid.

*Example 3*

In an open-ended glass liner was placed a mixture of 32 g. of para-toluic acid and 30 g. of dimer acids containing 84% of 4,4'stilbene dicarboxylic acid. The liner and contents were sealed in a stainless steel bomb, and hydrogen sulfide was added until a pressure of 260 pounds per square inch gauge was reached at room temperature. The bomb was placed in an oil bath maintained at 550° F., and allowed to remain for 16 hours. At the conclusion of the reaction the product was filtered and the cake was extracted successively with hot xylene and hot dioxane, as described in the first example. There were thus obtained 24.1 g. of unreacted para-toluic acid, 4.2 g. of by-products of undetermined constitution, and 35.6 g. of dimer acids containing 58% 4,4'stilbene dicarboxylic acid. Separation of the dimer acids through the potassium salts in the usual manner gave 18.3 g. of crude 4,4'stilbene dicarboxylic acid and 16.7 g. of 4,4'-bibenzyl dicarboxylic acid.

*Example 4*

A glass Carius tube was charged with 27.2 g. meta-toluic acid, 1.6 g. sulfur flowers, and 1.0 g. hydrogen sulfide. The tube was sealed, heated, and shaken at 510–535° F. for 6 hours; then cooled and opened to permit escape of hydrogen sulfide. The products were washed from the tube with approximately 100 cc. xylene, diluted to 150 cc. with more xylene, digested at 220° F. for 15 minutes, and filtered hot. The resultant white cake was washed with 50 cc. more of hot xylene, filtered and dried, to give 1.5 g. of xylene-insoluble material which showed no fluorescence under ultraviolet light, and had a neutral equivalent of 134.9. Spectrographic analysis showed this material to be a mixture containing approximately 20% 3,3'stilbene dicarboxylic acid and 80% 3,3'bibenzyl dicarboxylic acid. It had a melting point of 595–596° F.

The xylene filtrates were evaporated down to recover 26.0 g. meta-toluic acid, which contained a small amount of sulfur.

*Example 5*

Example 4 was repeated substituting para-toluic acid for meta-toluic acid. After reaction and xylene extraction of the products, 5.0 g. of a xylene-insoluble, light yellow powder was obtained, which had a bright blue fluorescence under ultraviolet light. It had a neutral equivalent of 132.0, and a melting point of 781° F. Spectrographic analysis showed this to be a mixture of 21% 4,4'stilbene dicarboxylic acid and 79% 4,4'bibenzyl dicarboxylic acid.

Evaporation of xylene filtrates permitted recovery of 22.8 g. para-toluic acid containing some sulfur and by-products.

*Example 6*

A glass Carius tube was charged with 1.7 g. 4,4'stilbene dicarboxylic acid, 11.9 g. para-toluic acid, and 1.4 g. hydrogen sulfide. The tube was sealed, heated, and shaken at 515–548° F. for 5.5 hours. Products were worked up as in the preceding examples, and yielded 1.5 g. of a white, xylene-insoluble powder with a blue fluorescence of much lower intensity than the starting material. Spectographic analysis of the original stilbene dicarboxylic acid showed it to be of approximately 90% purity, while the product was a mixture of 10% 4,4'stilbene dicarboxylic acid and 90% 4,4'bibenzyl dicarboxylic acid.

As may be readily observed from the foregoing examples, the preparation of bibenzyl dicarboxylic acids, stilbene dicarboxylic acids and dimer acid mixtures thereof, according to the process of my invention, is characterized by unusually high yields of product. The formation of by-products and the attendant complications in separating the desired dimer acid products are also at a minimum.

On comparison with the previous methods known to the art, the advantages of the process of my invention in preparing bibenzyl dicarboxylic acids, stilbene dicarboxylic acids and their mixtures by heating toluic acid in the presence of sulfur under a pressure of hydrogen sulfide are manifest. While, in the prior art, the yields of bibenzyl dicarboxylic acid and stilbene dicarboxylic acid were either consistently poor or required large amounts of expensive reagents in the preparation, the yield of bibenzyl dicarboxylic acid, stilbene dicarboxylic acid and mixtures thereof from inexpensive materials in the process according to my invention is excellent.

The bibenzyl dicarboxylic acids, stilbene dicarboxylic acids and dimer acid mixtures prepared according to the method of my invention have many possible uses. For example, the ester derivatives are suitable as plasticizers for various plastics. Other uses common in the art for dibasic aromatic acids such as their adaptation to the production of alkyd resins, fiber-forming polymers, etc., are also contemplated as applications for the bibenzyl dicarboxylic acids, stilbene dicarboxylic acids and dimer acid mixtures produced according to the present process.

In view of the foregoing illustrations of this invention, various modifications will be apparent to those skilled in the art and all such modifications as come within the scope of the appended claims are included within the present invention.

This application is a continuation-in-part of my previous United States patent application Serial No. 117,944, filed September 26, 1949.

I claim:

1. A process which comprises reacting toluic acid and sulfur at a temperature of from about 400 to about 700° F. under a pressure of hydrogen sulfide, separating bibenzyl dicarboxylic from the reaction product.

2. A process which comprises preparing bibenzyl dicarboxylic acid by reacting toluic acid and sulfur according to the reaction

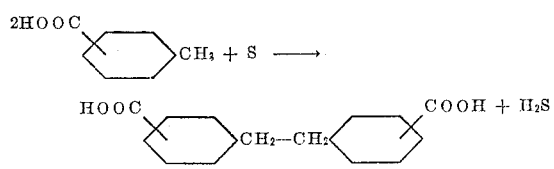

the foregoing reaction being carried out at a temperature of from about 400 to about 700° F. under a pressure of hydrogen sulfide, and thereafter separating the bibenzyl dicarboxylic acids from the reaction product.

3. A process which comprises preparing bibenzyl dicarboxylic acids by reacting stilbene dicarboxylic acid and hydrogen sulfide according to the reaction

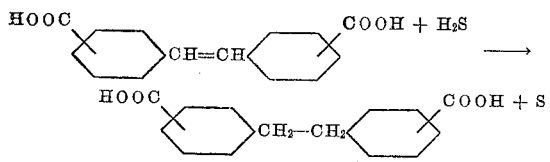

the foregoing reaction being carried out at a temperature of from about 400 to about 700° F., and thereafter separating the bibenzyl dicarboxylic acids from the reaction product.

4. A process of preparing bibenzyl dicarboxylic acids which comprises dehydrogenating and concurrently dimerizing toluic acids at the methyl group by heating said toluic acids to an elevated temperature of from about 400 to about 700° F. in the presence of sulfur under a pressure of hydrogen sulfide and thereafter separating the bibenzyl dicarboxylic acids from the reaction product.

5. A process of preparing a mixture of bibenzyl dicarboxylic acids and stilbene dicarboxylic acids which comprises dehydrogenating and concurrently dimerizing toluic acids at the methyl group by heating said toluic acids to an elevated temperature of from about 400 to about 700° F. in the presence of sulfur under a pressure of hydrogen sulfide and thereafter separating the bibenzyl dicarboxylic acid and stilbene dicarboxylic acid mixture from the reaction product.

6. A process of preparing bibenzyl dicarboxylic acids which comprises heating toluic acids to a temperature of from about 400 to about 700° F. with sulfur under a pressure of hydrogen sulfide for a period of from about 30 minutes to about 30 hours and thereafter separating the bibenzyl dicarboxylic acids from the reaction product.

7. A process of preparing bibenzyl dicarboxylic acids which comprises heating toluic acids to a temperature of from about 500 to about 600° F. with from about 5 to 75 mol per cent of sulfur based on the amount of toluic acid under a hydrogen sulfide pressure from about 125 to 600 pounds per square inch gauge for a period of from about 2 to 6 hours and thereafter separating the bibenzyl dicarboxylic acids from the reaction product.

8. A process according to claim 7, in which the toluic acids are present in the form of a mixture of their isomers.

9. A process according to claim 7, in which the toluic acids are substantially para-toluic acid.

References Cited in the file of this patent

UNITED STATES PATENTS

| Number | Name | Date |
|---|---|---|
| 2,610,191 | Toland | Sept. 9, 1952 |